United States Patent [19]

Mathers et al.

[11] Patent Number: 4,788,167

[45] Date of Patent: Nov. 29, 1988

[54] ALUMINUM NITRIDE/ALUMINUM OXYNITRIDE/GROUP IVB METAL NITRIDE ABRASIVE PARTICLES DERIVED FROM A SOL-GEL PROCESS

[75] Inventors: James P. Mathers, Woodbury; William P. Wood, Minneapolis, both of Minn.

[73] Assignee: Minnesota Mining and Manufacturing Company, St. Paul, Minn.

[21] Appl. No.: 933,014

[22] Filed: Nov. 20, 1986

[51] Int. Cl.$^4$ .............................................. C04B 35/58
[52] U.S. Cl. ..................................... 501/98; 501/102; 501/127; 501/153; 51/307
[58] Field of Search .................. 501/98, 153, 102, 96, 501/127; 51/307

[56] References Cited

U.S. PATENT DOCUMENTS

| | | | |
|---|---|---|---|
| 3,108,887 | 10/1963 | Lenie et al. | 501/98 |
| 3,171,715 | 3/1965 | Kleinsteuber | 23/14.5 |
| 3,331,783 | 7/1967 | Braun et al. | 252/301.1 |
| 3,565,643 | 2/1971 | Bergna | 501/98 |
| 3,676,161 | 7/1972 | Yates | 501/98 |
| 3,860,691 | 1/1975 | Gens | 423/254 |
| 3,904,736 | 9/1975 | Triggiani | 423/251 |
| 4,203,733 | 5/1980 | Tanaka et al. | 501/153 |
| 4,241,000 | 12/1980 | McCauley et al. | 264/65 |
| 4,314,827 | 2/1982 | Leitheiser et al. | 51/298 |
| 4,320,203 | 3/1982 | Brandt et al. | 501/87 |
| 4,435,513 | 3/1984 | Komeya et al. | 501/96 |
| 4,478,785 | 10/1984 | Huneby | 264/65 |
| 4,481,300 | 11/1984 | Hartnett et al. | 501/98 |
| 4,519,966 | 5/1985 | Aldinger et al. | 264/56 |
| 4,563,433 | 1/1986 | Yeckley et al. | 501/97 |

FOREIGN PATENT DOCUMENTS

| | | | |
|---|---|---|---|
| 69706 | 2/1982 | European Pat. Off. | |
| 55-158162 | 12/1980 | Japan | 501/98 |
| 58-223661 | 12/1983 | Japan | 51/307 |
| 60-191061 | 9/1985 | Japan | 501/98 |
| 60-171271 | 9/1985 | Japan | 501/98 |
| 61-117162 | 6/1986 | Japan | 501/98 |
| 919885 | 2/1963 | United Kingdom | 501/98 |

OTHER PUBLICATIONS

*Ceramic and Science Proceedings*, 1981 New England Section Topical Meeting on Nonoxide Ceramics (pp. 67-77).

M. B. Bever, ed. *Encyclopedia of Materials Science and Engineering*, Pergamon Press, Oxford (1986), (pp. 3206-3210).

*Engineering Property Data on Selected Ceramics*, vol. I, Nitrides, Metals and Ceramics Information Center, Battelle, Columbus, Ohio (Mar. 1976) (pp. 5.3.2.1-1 to 5.3.4-9).

Krulov et al., "Dispersing Effect of Formation of Structure During Baking of TiN AlN System Composition", *Khim Khom Tokhali*, vol. 29(6), 1986 (pp. 84-86).

Wentorf et al., "Sintered Superhard Materials", *Science*, vol. 208, May 23, 1980 (pp. 872-880).

Baldoni et al., "Ceramics for Machining", *Ceramic Bulletin*, vol. 67 (z), 1988 (pp. 381-387).

*Metal Cutting Bibliography* 1943-1956, Metal Cutting Committee, ASTME Research Fund, 1960 (p. 2 and Abstract No. 4415).

Von Herausgegeben, ed., *Applied Mineralogy*, Springer-Verlag, N.Y. (1971) pp. 154-163.

Launay, "Chemical Absts" vol. 104 (1986) #134626.

T. Sakai, *Sintering Theory and Practice*, Materials Science Monographs, edited by D. Kolar, S. Pejovnik and M. M. Ristic, vol. 14, pp. 591-596, Elsevier Scientific Publishing Co., Amsterdam (1982).

D. Turpin-Lannay et al., *Ceramic Powders*, edited by P. Vincenzini, pp. 891-897, Elsevier Scientific Publishing Company, Amsterdam (1983).

*Primary Examiner*—William R. Dixon, Jr.
*Assistant Examiner*—Andrew B. Griffis
*Attorney, Agent, or Firm*—Donald M. Sell; Lorraine R. Sherman

[57] ABSTRACT

A multiphase, microcrystalline, nearly fully dense ceramic composite has grains comprising 0 to 95 volume percent aluminum nitride, 0 to 95 volume percent polytypes of aluminum nitride, 0 to 95 volume percent gamma-aluminum oxynitride, and 5 to 50 volume percent of at least one of titanium nitride, zirconium nitride and hafnium nitride. The composite is useful to prepare a ceramic abrasive grit or article.

11 Claims, No Drawings

ALUMINUM NITRIDE/ALUMINUM OXYNITRIDE/GROUP IVB METAL NITRIDE ABRASIVE PARTICLES DERIVED FROM A SOL-GEL PROCESS

FIELD OF THE INVENTION

The present invention relates to compositions of matter which are ceramic composites in an aluminum nitride/gamma-aluminum oxynitride/Periodic Group IVB metal nitride system. In another aspect, ceramic abrasive particles and a method for their preparation by a sol-gel process are disclosed. In yet another aspect, a method for grinding a surface using the ceramic abrasive particle of the invention is disclosed.

BACKGROUND OF THE INVENTION

Aluminum nitride, gamma-aluminum oxynitride (ALON), and TiN are well known ceramics for applications such as electronic substrates, optical windows, and crucibles. ALON has been disclosed in U.S. Pat. No. 4,241,000 as an abrasive grain.

The mechanical properties of ceramic materials have been improved in recent years as a better understanding has been gained as to the effects of processing on the final ceramic microstructure. It is well known that low levels of porosity and a fine grain size are required for optimal mechanical performance of a ceramic. Microstructures possessing both of these characteristics are not readily obtained because as temperatures are increased to promote the elimination of pores during sintering, grain growth is also accelerated. One technique used to overcome this difficulty has been the combination of different crystalline components to form a composite material.

Ceramics composed of different combinations of AlN, polytypes of AlN, and ALON have been described in the literature, but the mechanical properties obtained have not been exceptional compared to other ceramic materials: T. Sakai, in "Sintering Theory and Practice", Materials Science Monographs, edited by D. Kolar, S. Pejovnik and M. M. Ristic, Vol. 14, p. 591-596, Elsevier Scientific Publishing Co., Amsterdam (1982); D. Turpin-Lannay, et al., in "Ceramic Powders" edited by P. Vincenzini, p. 891-897, Elsevier Scientific Publishing Co., Amsterdam (1983).

It is believed the background art does not teach the use of composites in the system AlN/ALON/TiN as abrasives. This is not surprising since AlN is a relatively soft ceramic with a hardness of only 1200 kg/mm$^2$. By comparison, Al$_2$O$_3$ and SiC, two commonly used abrasives, have hardness values of 2000 kg/mm$^2$ and 2950 kg/mm$^2$, respectively. Thus, ceramics containing AlN would not be expected to perform well as abrasives.

U.S. Pat. No. 4,320,203 describes composite cutting tools from a different system (Al$_2$O$_3$-ALON-TiN). In Example 1 the performance of these materials is compared to a composite of AlN, ALON, and TiN. However, the composition of this composite, its porosity, and its grain size are not described. The performance was considered poor and the patentee cautions against compositions containing AlN.

The background art in the AlN/ALON/TiN system is product oriented to relatively large shapes and forms, for example electronic substrates and crucibles, rather than small particulate products such as an abrasive grit. The methods of production employ ceramic powders which are pressed or otherwise shaped to the desired form, and then sintered or reaction-sintered to densify them. The manufacture of individual abrasive grits by these techniques is impractical due to the size and numbers required. Also, crushing of larger articles, such as billets, to form small particles is impractical because of the strength and toughness of these materials. Another problem with this process is the high cost of sinterable AlN and TiN powders. For example, commercial AlN powders typically cost $55-65/kg and cannot be sintered without extensive milling and size classification. Powders which are readily sinterable may cost as much as $325/kg.

Single phase ALON made by conventional powder processing is disclosed, for example, in U.S. Pat. Nos. 4,241,000 and 4,481,300. Single phase AlN made by conventional powder processing is disclosed, for example, in U.S. Pat. Nos. 4,435,513; 4,478,785; and 4,519,966.

It is known in the patent literature and technical publications to use sol-gel processes for the preparation of spherical, nuclear fuel particles of the carbides and nitrides of uranium and thorium. Typically hydrous sols of uranium oxide and thorium oxide are co-dispersed with carbon, formed into spheres, then gelled and reaction-sintered to form a carbide or nitride sphere. Examples of this teaching include: U.S. Pat. Nos. 3,171,715; 3,331,783; 3,860,691; and 3,904,736. The final products are typically less than 95% dense.

The preparation of abrasives comprising alumina and other metal oxides by a sol-gel process is disclosed in U.S. Pat. No. 4,314,827.

It is believed the use of sol-gel processes to prepare particles from mixed sols of alumina/carbon or alumina/titania/carbon followed by dehydration and reaction-sintering to form dense ceramics in the AlN/ALON/TiN system has not been disclosed in the background art.

SUMMARY OF THE INVENTION

Briefly, the present invention provides a microcrystalline, nearly fully dense ceramic composite in the system AlN/ALON/Periodic Group IVB nitride, preferably AlN/ALON/TiN. In another aspect, abrasive particles such as an abrasive grit are provided, comprising a uniform multiphase mixture of microcrystalline components in this system. In yet another aspect, a process for making an abrasive particle using sol-gel techniques and pressureless reaction-sintering is provided. In a further aspect, a method of grinding a surface using an abrasive particle of the present invention is disclosed.

The compositions of the invention are polycrystalline composites containing various combinations of AlN, ALON, and Periodic Group IVB metal nitride grains. In some embodiments polytypes of AlN may also be present. The grains of the composites are sintered together and uniformly distributed throughout the composites. These composites are nearly fully dense with less than 4 volume percent pores. The maximum grain size is less than 5 micrometers and more typically less than 2 micrometers. The materials are useful, for example, as abrasive particles.

It has been found that abrasive articles (discs) comprising abrasive particles of the present invention are at least 50 percent more effective, and in some cases 300 or more percent more effective, than a conventional brown fused aluminum oxide abrasive disc.

To prepare the ceramics in the preferred AlN, ALON, TiN system of the invention by a sol-gel process, carbon and TiO$_2$ are dispersed in an alumina sol, formed into the desired shape, gelled, dried and reaction-sintered to form a dense ceramic in the AlN-/ALON/Periodic Group IVB metal nitride system. AlN and ALON are formed by a reaction between alumina, carbon, and nitrogen from the furnace atmosphere. TiN is formed by a similar reaction between TiO$_2$, carbon, and nitrogen. The proportions of AlN, ALON, and TiN in the final composite are determined by the relative amounts of alumina, TiO$_2$, and carbon used to formulate the sol.

In this Application:

"AlN/ALON/TiN" means a system including at least two of aluminum nitride (including polytypes of aluminum nitride), gamma-aluminum oxynitride, and titanium nitride;

"AlN/ALON/Group IVB metal nitride" means a system including at least two of aluminum nitride (including polytypes of aluminum nitride), gamma-aluminum oxynitride, and Periodic Group IVB metal nitride (i.e., ZrN, HfN, TiN);

"ceramic" means an inorganic material composed of both metallic and nonmetallic elements, e.g. oxides, nitrides, carbides;

"solid solution" means a single crystalline phase which may be varied in composition within finite limits without the appearance of an additional phase;

"ALON" means an acronym which represents gamma-aluminum oxynitride, a solid solution formed between Al$_2$O$_3$ and AlN according to the equation:

$$Al_2O_3 + xAlN \rightarrow Al_{(2+x)}O_3N_x \qquad \text{Eq. 1}$$

There is substantial disagreement in the literature on the composition range for this material, but a generally accepted range would be 20–40 mole percent AlN, i.e. $x=0.25-0.87$ in equation 1. ALON has a cubic, spinel type of crystal structure as opposed to the hexagonal structure of alpha-Al$_2$O$_3$. Thus, in the past it has sometimes been referred to as nitrogen stabilized cubic Al$_2$O$_3$ or nitrogen containing aluminum oxide. It is now more commonly known by the acronym ALON;

"polytypes of AlN" means compounds having the same crystal structure as AlN, but with oxygen impurities in atomic planes which are periodically spaced in the crystals. Several polytypes have been observed in materials processed above 1850° C.; e.g., Al$_{10}$N$_8$O$_3$;

"abrasive particle" means a grit, flake, rod, or other shape having an average maximum dimension of 5 mm or less, and capable of abrading surfaces, e.g., metals ceramics, glass, and plastics;

"grain" means an individual crystal which together with other grains (crystals) make up a polycrystalline ceramic particle, for example an abrasive grit or flake;

"composite" means a material composed of a uniform mixture of two or more separate phases. It refers to polycrystalline ceramic particles composed of two or more different types of grains (crystals);

"sol" means a colloidal suspension of a solid phase in a liquid medium having an average particle size below 0.1 micrometer in a liquid medium;

"gel" means a 3-dimensional solid network containing a large volume of interconnecting pores filled with a liquid;

"sol-gel processing" means using a sol as one of the principal starting materials and at some point gelling the sol means of chemical additives or dehydration to obtain a shaped article; and "conventional powder processing" means a process utilizing powders as starting materials, typically with an average particle size in the range of 0.1 to 5 micrometers and shaping these into an article using such well known techniques as dry-pressing, slip-casting, injection molding, isostatic pressing, hot-pressing, etc.

Abrasive particles in the system Al$_2$O$_3$/ALON/-Group IVB metal nitride which are derived from a sol-gel process are disclosed in assignee's copending application U.S. Ser. No. 932,941, now abandoned. (attorney's docket No. F.N. 41897 USA 6A), filed the same date as this application.

DETAILED DESCRIPTION OF THE INVENTION

The present invention provides a microcrystalline, nearly fully dense ceramic composite comprising 0 to 95, preferably 0 to 85, and most preferably 0 to 45, volume percent aluminum nitride or polytypes of aluminum nitride, 0 to 95, preferably 0 to 85, and most preferably 40 to 85, volume percent gamma-aluminum oxynitride, and 5 to 50, preferably 15 to 35, volume percent of Periodic Group IVB metal nitride which preferably is titanium nitride.

In another aspect, the present invention provides a ceramic abrasive particle comprising a uniform multiphase composite of microcrystalline components, said composite comprising 0 to 95, preferably 0 to 85, and most preferably 0 to 45, volume percent aluminum nitride or polytypes of aluminum nitride, 0 to 95, preferably 0 to 85, and most preferably 40 to 85, volume percent gamma-aluminum oxynitride, and 0 to 50, preferably 15 to 35, volume percent of a Periodic Group IVB metal nitride which preferably is titanium nitride.

A method of preparing a ceramic abrasive particle comprises the steps of:

(a) preparing a mixed sol comprising an alumina precursor which preferably is aluminum monohydrate, carbon or chemical precursor thereof, optionally at least one of titanium dioxide, zirconium dioxide, or hafnium dioxide or chemical precursor thereof, optionally glycerol or other carbon stabilizing agent, and an alpha-alumina seeding agent, said components being present in proportions sufficient to provide a ceramic abrasive particle comprising (1) 0 to 100, preferably 0 to 85, and most preferably 0 to 45, volume percent aluminum nitride or polytypes of aluminum nitride, (2) 0 to 100, preferably 0 to 85, and most preferably 40 to 85, volume percent gamma-aluminum oxynitride, and (3) 0 to 50, preferably 15 to 35, volume percent of at least one of titanium nitride, zirconium nitride, and hafnium nitride, (b) gelling said mixed sol, (c) drying said resulting gelled sol to provide granules, (d) optionally, crushing and sieving said granules to provide sized granules, (e) calcining said granules at a temperature in the ranges of 600° to 1200° C. in a nitrogen atmosphere to remove volatile constituents.

(f) reaction-sintering said calcined granules at a temperature in the range of 1400° to 2000° C. to provide the ceramic abrasive particle.

To prepare the abrasive particle or ceramic composite of the invention a mixed sol comprising sources of alumina, carbon, and optionally TiO2 or other Group IVB metal oxide is formed into the desired shape, e.g. an abrasive grit, by sol-gel techniques. The gelled article is heated in a nitrogen atmosphere. During the heat treatment cycle (e.g., at temperatures between 600° and 1200° C.), fugitives or volatiles are removed. The reaction to form AlN, gamma-ALON, or other aluminum oxynitride phases proceeds with subsequent sintering at higher temperatures (e.g., 1400° to 2000° C.) to produce a highly dense particle. The first stage of reaction is:

$$Al_2O_3 + 3C + N_2 \xrightarrow{1400°C.} 2AlN + 3CO \quad \text{Eq. 2}$$

The amount of carbon added to the sol determines the amount of $Al_2O_3$ which will be converted to AlN. Any residual $Al_2O_3$ will combine with some or all of the AlN at higher temperatures (e.g., 1600° to 1900° C.) to form ALON.

$$Al_2O_3 + xAlN \rightarrow Al_{(2+x)}O_3N_x \quad \text{Eq. 3}$$

If the carbon content of the initial sol is too low then insufficient AlN will be formed by Eq. 2 and there will not be enough AlN to fully convert the residual $Al_2O_3$ to ALON. In that case residual $Al_2O_3$ will be present after reaction-sintering and composites in the $Al_2O_3$-/ALON/TiN system will be obtained (see assignee's copending patent application U.S. Ser. No. 932,941, now abandoned, filed the same date as this application). The amount of carbon determines the relative proportions of AlN and $Al_2O_3$ formed in the early stages of the reaction, and this in turn determines the relative amount of AlN and ALON in the final composite. If the sintering temperature is above about 1850° C., then polytypes of AlN may be formed by reaction between AlN and ALON. If the precursor sol contains a source of TiO2, along with additional carbon, then an additional reaction occurs to produce TiN as well:

$$TiO_2 + 2C + 0.5N_2 \rightarrow TiN + 2CO \quad \text{Eq. 4}$$

Other oxide from Group IVB of the periodic table, for example zirconia, when present will be convicted to their respective nitrides:

$$ZrO_2 + 2C + \tfrac{1}{2}N_2 \rightarrow ZrN + 2CO \quad \text{Eq. 5}$$

Thus, composites in the system AlN/ALON/ZrN, or the system AlN/ALON/HfN can also be prepared by the process of the invention.

Preparation of the sol:

The alumina precursor sol may be prepared from an alumina monohydrate powder. A preferred source is the aluminum monohydrate prepared by hydrolyzing aluminum isopropoxide and is available from Chattem Chemicals, Chattanooga, TN., U.S.A. The alumina precursor powder is dispersed in an aqueous medium, preferably in 80° C. deionized water, acidified with nitric acid (e.g. to pH 1.0 to 4.0) as a peptizing agent. The sols typically contain about 15 percent by weight $Al_2O_3$ solids after calcining to 1000° C. Carbon black and other oxides, when used, may be dispersed into the alumina sol by ball-milling for 48 hours. A preferred source of carbon black is Monarch TM 1300, Cabot Corporation, Glen Ellyn, IL. A preferred source of TiO2 is fumed TiO2 (P-25 TM, Degussa Corporation, Teterboro, NJ). It will be recognized that various chemical precursors can be used as sources of these materials. Numerous water-soluble organics which decompose on heating in N2 to form carbon could serve as a source of carbon, e.g. polyvinyl alcohol, polyvinylpyrrolidone, and sucrose. TiO2 could be formed by the controlled hydrolysis of TiCl4 in the aqueous alumina sol.

In the preparation of the carbon-containing sol, certain critical requirements need to be observed. First the carbon black should be dispersed so that the largest aggregates or agglomerates are less than about 1 micrometer in size. The bulk of the carbon must be dispersed on a much finer scale. Ball-milling is an effective procedure to achieve such dispersions. However, careful attention must be given to impurities introduced from wear of the milling media and ball jar.

During the later heat-treating stages of the process the aluminum monohydrate present in the original sol will undergo a sequence of crystallographic phase transformations, forming different so-called transition crystal structures before arriving at the stable high temperature alpha-alumina structure. It is important that the sol contain a small fraction of alpha-alumina crystals to nucleate or seed the final transformation to the alpha structure. If these are not present the alpha-$Al_2O_3$ will form a vermicular, porous microstructure which is difficult to sinter to full density. Seeding causes the alpha-$Al_2O_3$ to form a microstructure consisting of roughly equiaxed grains and pores which is more readily sintered to full density. M. Kumagi and L. Messing describe this phenomena (see J. Am. Ceram. Sox. 68(9)500-505 (1985)).

A convenient means for seeding the sol is to mill it with a grinding media composed of alpha-alumina (for example, Burundum TM, Norton Company, Worcester, MA). The quantity of alpha-alumina nucleating seeds, which are obtained from the wear of the Burundum milling media, must be limited. When carbon black is milled directly into the sol formulation with Burundum media, numerous pores 5-10 micrometers in size are observed in the final product. The porosity is eliminated by reducing the seed concentration in the sol as discussed below. It was not determined if the elimination of porosity was due to the quantity of nucleating seed, or if it was related to silica and/or other impurities in the media.

In formulating sols with limited amounts of carbon, the concentration of seeds can be reduced by milling a more concentrated carbon/alumina sol and then diluting the milled sol back to the desired formulation with additional alumina sol. However, the concentration of carbon which can be milled is limited to about 4 wt. percent, otherwise the sol becomes too viscous to obtain a good dispersion. In the formulations requiring higher amounts of carbon, the dilution factor is insufficient to lower the seed concentration to a satisfactory level. Attempts to use a high purity alumina media to disperse the carbon have not been successful as this type of media shows excessive wear. This loads the sol with a large quantity of 1-2 micrometer crystals of $Al_2O_3$ and also shifts the $Al_2O_3$ content of the sol in an unpredictable manner, in one instance more than doubling the $Al_2O_3$ content of the sol.

A preferred procedure is to pre-mill a portion of the alumina sol without any carbon black and using the Burundum media. This seeded sol is added to an alumina/carbon sol which was milled with a high purity zirconia media to disperse the carbon and any other metal oxides which may have been added to the sol. In this way the concentration of seeds can be maintained at an optimal level regardless of the carbon content of the formulation. The zirconia contaminants introduced by milling with zirconia media resulted in a small amount (i.e., less than 3 volume percent) of dispersed ZrN in the microstructure, the carbothermal reduction product of the zirconia impurities.

When a second oxide is added to the alumina/carbon sol to create the secondary nitride phase, it is important to ensure that the oxide is compatible with the alumina sol. For example, both the alumina and titania powders utilized in the illustrative examples formed stable sols at a pH of 3.5. However, in trials where they were combined, large chainlike flocs formed in the sol when it was allowed to stand undisturbed. In this particular case stirring the sol during gelation readily broke up these flocs and prevented reagglomeration.

Gelation of the Sol:

The sol can be gelled simply by the loss of water during drying. Temperatures between about 20° and 90° C. are satisfactory. It is desirable to stir the gel either occasionally or at regular intervals to maintain a uniform mixture of components.

It is preferable, however, to gel the sol prior to drying to insure that a uniform distribution of the dispersed ingredients is maintained. A convenient means of gelling the sol is the addition of an aqueous solution of aluminum nitrate. For example, the addition of a 25 weight percent solution of aluminum nitrate in water in an amount equal to 4 weight percent of the alumina sol has been found to gel a sol with an $Al_2O_3$ content of 15 weight percent, typically in 5 to 15 minutes. Other well known means of gelling alumina sols may also be used (see, for example J. L. Woodhead, J. Mater, Educ. 6(9), 887–925 (1984)). Generally these involve altering the pH or ionic content of the sol.

Since the carbon content of the gel determines the extent of nitride formation during reaction-sintering it is important to control the carbon content to arrive at the desired final composition. During calcining of the gel, the temperature and conditions are sufficient to promote the reaction between water vapor and carbon:

$$H_2O + C \rightarrow CO + H_2.$$   Eq. 6

This reaction can reduce the carbon content by as much as 30 weight percent. The addition of small amounts of glycerol to the sol before gellation has been found to stabilize the carbon content during calcination of the dried gel.

It was discovered that sols which were gelled with ammonium acetate rather than aluminum nitrate were not plagued with loss of carbon after calcining. However, ammonium acetate causes sols prepared from Chattem alumina to gel in a rapid, uncontrolled fashion with the formation of large flocs. Addition of aluminum nitrate gels the sol in a much more controlled fashion with a minimal amount of floc. Several different organic additives were evaluated with the objective of finding a water-soluble organic which would not interfere with the gelation of the sol by aluminum nitrate and would stabilize the carbon content. Gelling and calcining experiments were conducted on several sols which had a carbon content of 5.9 weight percent. In each case the amount of organic added to the sol was equal to 5 weight percent of the expected solids content of the sol after calcining. Results for several organics appear in Table I. Of these only ammonium acetate interfered with gelation.

TABLE I

| Carbon Content of Calcined Gels-by Analysis | |
| --- | --- |
| 1. control (no organic) | 5.0 wt % C. |
| 2. ammonium acetate | 5.9 |
| 3. acetic acid | 5.3 |
| 4. aluminum acetate | 5.2 |
| 5. glycerol | 6.0 |

The data of Table I show that both ammonium acetate and glycerol were particularly effective in preventing the oxidation of carbon (the accuracy of the analytical techniques used is believed to be ±0.1 weight percent). Acetic acid and aluminum acetate were less effective.

The differences cannot be attributed simply to extra carbon derived from the pyrolysis of the organic additive. Measurements of the carbon residue in the same gels without carbon black showed negligible amount of carbon (i.e., less than 0.1 weight percent)

If glycerol or another similar acting water soluable organic is not added to the sol the carbon content must be raised to compensate for that which is later lost in calcining.

Drying and Calcining the Gel:

The gel is allowed to open air dry for about 24 hours, and then further dried in a 90° C. oven to remove most of the free water. The gell will break-up during drying, forming coarse granules ranging from about 2 to 15 mm in size. At this point the dry gel may be comminuted and graded, taking into account shrinkage which will occur later, so as to obtain the desired size in the final product. The remaining water and fugitive volatiles are then removed by calcination with slow heating up to 1000° C. under a nitrogen atmosphere.

Reaction-Sintering:

In the reaction-sintering process the carbon reacts with the alumina and other metal oxides which may be present to form the desired nitrides or oxynitrides. These nitrides densify in the later stages of the process. The reaction-sintering may be performed in a graphite element, nitrogen atmosphere furnace. The calcined gel particles are preferably reacted in a boron nitride crucible with a series of holes 1.0 mm in diameter (0.040 in.) drilled in the bottom of the crucible to allow an unobstructed nitrogen flow. The nitrogen flow in the furnace is directed down through the bed of reactants and is then exhausted from the furnace sweeping away the CO reaction product. A suitable heating schedule was:

| | |
| --- | --- |
| room temp. → 1000° C. | about 15 min. |
| 1000 → 1400° C. | about 200° C./hr. |
| 1400° C. | hold 0 to 5 hr* |
| 1400 → 1900° C. | about 25° C./min. |
| 1900° C. | hold 2 hours |
| cool furnace | about 1.5 hours |

*The 1400° C. soak time was varied with carbon content.

A 5.9 weight percent carbon/alumina composition (100 vol. percent ALON) required no soak time whereas a 26.1 weight percent carbon/alumina composition (100 vol. percent AlN) was held at 1400° C. for five hours to ensure full nitriding before densification.

The composite materials may be used as loose grain, flakes, rods, or other shaped particles, or used to make coated abrasive products, e.g., discs, belts, grinding wheels, nonwoven abrasive products and other products where abrasive granules or particles are typically employed. While particularly useful as abrasive particles, the materials described could also be useful in articles requiring hardness and water-resistance, for example: computer read/write heads, bearings, extrusion or drawing dies, thread guides, ballistic armor, milling media, etc. A number of other articles which would employ the thermal stability and corrosion resistance of AlN and TiN can be envisioned, for example: crucibles or nozzles for pouring molten metals; etc.

Objects and advantages of this invention are further illustrated by the following examples, but the particular materials and amounts thereof recited in these examples, as well as other conditions and details, should not be construed to unduly limit the invention.

EXAMPLE 1

Abrasive particles with a target composition of 100 vol percent ALON were prepared as follows:

Step 1

An alumina, AlO(OH), sol was made using 100 grams of Dispersible Alumina TM, (Chattem Chemicals, 1715 W. 38th St., Chattanooga, Tenn.), 406.6 grams of distilled water and 4.536 grams of concentrated $HNO_3$ (70%). The distilled water was heated to 80° C. while being stirred at a moderate speed using a Premier Dispersator TM (Premier Mill Corporation, 1071 Ave. of the Americas, New York, N.Y. 10018). The Chattem powder was slowly added to the water and stirred for 5 minutes at 80° C. The $HNO_3$ was then added very slowly to avoid any foaming. After all the $HNO_3$ had been added the sol was stirred for an additional 15 minutes holding the temperature at 80° C. The sol was transferred to a bottle and the top covered with a Pyrex TM petri-dish to minimize water loss during subsequent heating. The sol was heat-treated at 90° C. for 24 hours. After heat-treating the sol was allowed to cool to room temperature and the bottle capped.

Step 2

Three hundred grams of the alumina sol prepared in Step 1 was weighed in a size 00—Rolex TM milling jar (Norton Co., One New Bond St., Worcester, MA 01606) already containing 1000 grams of 0.64 cm×0.64 cm (¼ in.×¼ in.) Burundum TM alpha-alumina grinding media (Norton Co.). The sol was milled for 20 hours at a milling speed of 60 RPM. After milling, the sol was poured into a polyethylene bottle and the contents kept stirring with a magnetic stirrer to avoid any milling contaminants (alpha-$Al_2O_3$ seed crystals) from settling out.

Step 3

A sol containing 4 weight percent carbon was then prepared using 12.0 grams of Monarch TM 1300 carbon black (Cabot Corporation, 800 Roosevelt Blvd., Glen Ellyn, IL) and 288.0 grams of the Chattem sol.

Both ingredients were weighed into a size 00—Rolex jar already containing 1600 grams of 0.64 cm×0.64 cm (¼ in.×¼ in.) $ZrO_2$ grinding media (Corning TM Glass Works, Houghton Park, Corning, NY 14830). The 4 weight percent carbon sol was allowed to mill for 48 hours at a milling speed of 60 RPM.

Step 4

Below is the formulation used to prepare the gelling composition. This formulation will produce 100 grams of calcined gel.

---
147.5 g - 4 weight percent carbon sol (from Step 3)
158.7 g - milled Chattem sol (from Step 2)
334.4 g - Chattem sol (from Step 1)
5.0 g - glycerol
25.4 g - 25 weight percent aluminum nitrate in water
---

All ingredients were mixed (except the aluminum nitrate solution) using an electric stirrer set just fast enough to stir the entire batch. The mix was stirred for 15 minutes and then the gelling agent (aluminum nitrate solution) was slowly added. When all of the gelling agent had been added, the entire batch was stirred for 5 additional minutes.

Step 5

The sol was poured into a large Pyrex TM tray where it gelled within 15 min. The gel was then allowed to dry at room temperature for 24 hours.

Step 6

The gel was dried in a circulating air oven for 24 hours at 90° C. After oven-drying, the dried gel was lightly crushed using a mortar and pestle and then seived to (25 to 40) mesh, U.S. Standard Sieve Series.

Step 7

The dried-gel (25 to 40 mesh) was calcined in a mullite tube furnace under flowing $N_2$ atm. (1900 cc/min) using the following time/temperature conditions:

---
| room temp. → | 1000° C. (about 100° C./hr) |
| 1000° C. → | (1 hr) |
| 1000° C. → | room temp. (about 100° C./hr) |
---

Step 8

The calcined gel was then reaction-sintered in a graphite element resistance furnace (Astro TM Series 1000, Astro Furnace Co., 606 Olive St., Santa Barbara, CA 93101) under the following sintering schedule:

---
| room temp. → | 1000° C. | (about 15 min) |
| 1000° C. → | 1400° C. | (about 200° C./hr) |
| 1400° C. → | 1880° C. | (about 25° C./min) |
| 1880° C. → | | (2 hr) |
---

Reaction-sintering was done in a BN (flow-thru) crucible with flowing $N_2$ (1180 cc/min).

Step 9

The reaction-sintered material was then seived as described in Example 7 below.

The reaction-sintered grit was gray in color. Optical microscopy showed only a single phase with a grain size ranging from 10 to 50 micrometers. X-ray diffraction showed ALON with just a trace of AlN as an impurity. The density of the grit, measured by an Archimedes technique (i.e., first weighing a quantity of the abrasive grit and then determining the volume of alcohol displaced when the grain is immersed in the alcohol) was 3.66 g/cm$^3$, 98.9 percent of the theoretical density for ALON.

EXAMPLE 2

Abrasive particles with a target composition of 10 vol. percent AlN, 90 vol. percent ALON were prepared following the procedures of Example 1 with these exceptions:

Step 4

Below is the formulation used to prepare the gelling composition. This formulation will produce 100 grams of calcined gel.

| 322.5 g | - 4 weight percent carbon sol |
| 149.2 g | - milled Chattem sol (from Step 2) |
| 137.9 g | - Chattem sol (from Step 1) |
| 5.0 g | - glycerol |
| 23.9 g | - 25 weight percent aluminum nitrate in water |

The mixing procedure was the same as used in Example 1.

Step 6

The procedure was the same as in Example 1 except the dried-gel was seived to 20 to 35 mesh.

Step 8

The procedure was the same as in Example 1 except that reaction-sintering took place using the following schedule:

| room temp. → | 1000° C. (about 15 min) |
| 1000° C. → | 1400° C. (about 200° C./hr) |
| 1400° C. → | (3 hr) |
| 1400° C. → | 1880° C. (about 25° C./min) |
| 1880° C. → | (2 hr) |

The reaction-sintered grit was light gray in color. Optical microscopy and X-ray diffraction confirmed the expected phases and proportions of components. The AlN was in the form of lath-like grains, typically 0.3 micrometers across and 1 to 8 micrometers long. The grain size of the ALON matrix was in the range of 2 to 5 micrometers. The majority of the grit cross-sections appeared fully dense when viewed at a magnification of 450x, but a few contained some isolated pores in the 1 to 2 micrometer size range.

EXAMPLE 3

Abrasive particles with a target composition of 50 vol. percent AlN, 50 vol. percent ALON were prepared following the procedures of Example 1 with these exceptions.

Step 3

The procedure was the same as in Example 1 except the 4 weight percent carbon sol was prepared using 12.0 grams of Monarch 1300 carbon black, 76.7 grams of the $Al_2O_3$ milled Chattem sol and 211.3 grams of the unmilled Chattem sol.

Step 4

Below is the formulation used to prepare the gelling composition. This formulation will produce 100 grams of calcined gel.

| 537.5 g | - 4 weight percent carbon sol |
| 34.0 g | - Chattem sol (Step 1) |
| 5.0 g | - glycerol |
| 22.8 g | - 25 weight percent aluminum nitrate in water |

The mixing procedure was the same as used in Example 1.

Step 6

The procedure was the same as in Example 1 except the dried gel was seived to 20 to 35 mesh.

Step 8

The procedure was the same as in Example 1 except that reaction-sintering took place according to the following schedule:

| room temp. → | 1000° C. (about 15 min) |
| 1000° C. → | 1400° C. (about 200° C./hr) |
| 1400° C. → | (5 hr) |
| 1400° C. → | 1880° C. (about 25° C./min) |
| 1880° C. → | (2 hr) |

The reaction-sintered grit was light gray in color. Optical microscopy showed two different interconnected phases with a grain size of less than about 3 micrometers. The majority of the grit cross-sections appeared fully dense. X-ray diffraction showed both ALON and AlN, but also some $Al_{10}N_8O_3$ which is a polytype of AlN.

EXAMPLE 4

Abrasive particles with a target composition of 100 vol. percent AlN were prepared following the procedures of Example 1 with these exceptions.

Step 3

The procedure was the same as in Example 1 except the 4 weight percent carbon sol was prepared using 12.0 grams of Monarch 1300 (carbon black), 46.4 grams of the $Al_2O_3$ milled Chattem, 138.4 grams of the unmilled Chattem sol and 103.2 grams of distilled water (adjusted to pH of 3.5 with nitric acid).

Step 4

Below is the formulation used to prepare the gelling composition. This formulation will produce 100 grams of calcined gel.

| 800.0 g | - 4 weight percent carbon sol |
| 5.0 g | - glycerol |
| 19.7 g | - 25 weight percent aluminum nitrate in water |

The mixing procedure used was the same as in Example 1.

Step 6

The procedure was the same as in Example 1 except the dried gel was seived to 20 to 35 mesh.

Step 8

The procedure was the same as in Example 1 except reaction-sintering took place according to the following schedule:

| room temp. → | 1000° C. (about 15 min) |
| 1000° C. → | 1400° C. (about 200° C./hr) |
| 1400° C. → | (5 hr) |
| 1400° C. → | 1800° C. (about 25° C./min) |
| 1880° C. → | (2 hr) |

The reaction-sintered grit was light gray in color. X-ray diffraction showed that the grit was composed primarily of AlN, some $Al_{10}N_8O_3$ which is a polytype of AlN, and a small amount (about 5 vol. percent) amount of ALON. Optical microscopy revealed a lath-like phase of $Al_{10}N_8O_3$ randomly distributed throughout a matrix composed primarily of AlN. These lath-like grains were typically 1 to 4 micrometers across and 5 to 50 micrometers in length. The grain size of the matrix was in the range of 2 to 5 micrometers. Many of the grit cross-sections were nearly fully dense with only a few isolated pores in the 1 to 2 micrometer size range.

EXAMPLE 5

Abrasive particles with a target composition of 25 volume percent TiN, 75 volume percent ALON were prepared following the procedures of Examples 1 with these exceptions.

Step 3

A 3.2 weight percent carbon sol was prepared using the following formulation:

```
9.6 g   - Monarch 1300 (carbon black)
55.3 g  - Al2O3 milled Chattem sol (Step 2)
165.8 g - Chattem sol (Step 1)
20.3 g  - TiO2 (Degussa P-25, Degussa Corp.,
          P.O. Box 2004, Teterboro, NJ
          07608)
49.1 g  - distilled water (pH 3.5)
```

Step 4

Below is the formulation used to prepare the gelling composition. This formulation produced 61.3 grams of calcined gel

```
300.0 g - 3.2 weight percent carbon sol
3.1 g   - glycerol
8.8 g   - 25 weight percent aluminum
          nitrate in water
```

All ingredients, except the aluminum nitrate solution were mixed using an electric stirrer rotating just fast enough to stir the entire batch. The formulation was stirred for 15 minutes and then the gelling agent (aluminum nitrate solution) was slowly added. When all of the gelling agent had been added the entire batch was allowed to stir for 5 minutes. When mechanical mixing was stopped, the mixture started to gel within seconds. Stirring was continued by hand for 5 minutes to completely break up any TiO2 flocks that may have been present in the mix.

Step 6

The procedure was the same as Example 1 except the dry gel was seived to 20 to 35 mesh.

Step 8

The calcined gel was then reaction-sintered under the following conditions:

```
room temp. →   1000° C. (about 15 min)
1000° C. →     1400° C. (about 200° C./hr)
1400° C. →     (5 hr)
1400° C. →     1900° C. (about 25° C./min)
1900° C. →     (2 hours)
```

Reaction sintering was done in a BN (flow-thru) crucible with flowing N2 (1180 cc/min).

The reaction-sintered grit was yellow-brown in color as fired, but showed a metallic gold luster when sectioned and polished. Optical microscopy and X-ray diffraction showed the expected phases, TiN and ALON. The TiN was uniformly distributed throughout the material and all phases present had a maximum grain size of about 2 micrometers. The material appeared to be fully dense when viewed at a magnification of 450x. The density of the grit was 4.05 g/cm$^3$ which is 97.8 percent of the density expected for a composite composed of 25 volume percent TiN and 75 volume percent ALON.

EXAMPLE 6

Abrasive particles with a target composition of 25 vol. percent TiN, 75 vol. percent AlN were prepared following the procedures of Example 1 with these exceptions:

Step 3

A 3.6 weight percent carbon sol was prepared using the following formulation:

```
10.8 g  - Monarch 1300 (carbon black)
28.0 g  - Al2O3 milled Chattem sol (Step 2)
83.8 g  - Chattem sol (Step 1)
9.7 g   - TiO2 (Degussa P-25)
167.7 g - distilled water (pH 3.5)
```

Step 4

Below is the formulation used to prepare the gelling composition. This formation will produce 35.3 grams of calcined gel:

```
300.0 g - 3.6 weight percent carbon sol
1.8 g   - glycerol
4.5 g   - 25 weight percent aluminum
          nitrate in water
```

The mixing procedure was the same as used in Example 5.

The reaction-sintered grit was much like the grit of Example 5 in appearance. It was yellow-brown in color but had a metallic gold luster when polished. Optical microscopy showed that the TiN was uniformly distributed throughout the material and that all phases present had a maximum grain size of about 2 micrometers. The composite appeared fully dense when viewed at a magnification of 450x. X-ray showed ALON (about 5 vol. percent) was also present. The measured density was 3.76 g/cm$^3$ which is 98.7 percent of the expected density for a fully dense composite composed of 25 volume percent TiN, 75 volume percent AlN.

EXAMPLE 7

The abrasive particles of Examples 2, 3, 5, and 6 were used to make 17.75 cm (7-inch) diameter coated abrasive discs. The abrasive particles for each disc consisted of 1:1 by weight mixture of 40–45 mesh (average diameter 390 micrometers) and 45–50 mesh (average diameter 330 micrometers) screen cuts obtained using U.S. Standard Sieves. The discs were prepared using conventional coated abrasive making procedures, conventional 0.76 mm vulcanized fiber backings and conventional calcium carbonate-filled phenolic resin make (52 weight percent CaCO3 and 48 weight percent phenol-formaldehyde resin) and size (68 weight percent CaCO3 and 32 weight percent phenol-formaldehyde resin) resins, without adjusting for mineral density differences. The make resin was precured for 75 minutes at 80° C. The size resin was precured for 90 minutes at 88° C. followed by a final cure at 100° C. for 10 hours. Conventional one-trip coating techniques (single disc) and curing in a forced air oven were employed. The coating weights (wet basis) were as follows:

| Coating | Coating weight (g/cm²) |
| --- | --- |
| make resin | 0.017 |
| size resin | 0.0283 |
| mineral | 0.0513 |

The resultant cured discs were first conventionally flexed to controllably crack the hard bonding resins, mounted on a beveled aluminum back-up pad, and used to grind the face of a 1.25 cm×18 cm Type 1018 cold rolled steel workpiece. The disc was driven at 5000 rpm while the portion of the disc overlying the beveled edge of the back-up pad contacted the workpiece at a pressure of 0.91 kg/cm²; it generated a disc wear path of about 140 cm². Each disc was used to grind 12 separate workpieces for 1 minute each. The cumulative cut of the 12 cuts for each disc is shown in Table II below. The cumulative cut of a disc made using conventional brown fused alumina abrasive is also shown for comparison.

TABLE II

| | Grinding Results on 1018 Steel | |
| --- | --- | --- |
| Sample | Composition | Total Cut* |
| Comparative sample | fused Al₂O₃ control | 268 g |
| 1 (Ex. 2) | 10 vol. percent, AlN, 90 vol. percent ALON | 606 g |
| 2 (Ex. 3) | 50 vol. percent AlN, 50 vol. percent ALON | 405 g |
| 3 (Ex. 5) | 25 vol. percent TiN, 75 vol. percent ALON | 836 g |
| 4 (Ex. 6) | 25 vol. percent TiN, 75 vol. percent AlN | 710 g |

*weight of metal removed

The data of Table II show that the coated abrasive discs of the invention were generally much more effective (at least about 50 percent more effective) polishing and/or grinding agents than a conventional brown fused alumina abrasive disc.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A microcrystalline, nearly fully dense ceramic composite consisting of grains consisting essentially of
    0 to 90 volume percent aluminum nitride or polytypes of aluminum nitride,
    5 to 95 volume percent gamma-aluminum oxynitride, and
    5 to 50 volume percent of at least one of Periodic Group IVB metal nitrides,
said composite being essentially free of alumina and containing less than 4 volume percent pores, and the size of said grains being less than 5 micrometers.

2. The ceramic composite according to claim 1 having grains consists essentially of
    0 to 45 volume percent aluminum nitride, said composite being essentially free of alumina or polytypes of aluminum nitride,
    40 to 85 volume percent gamma-aluminum oxynitride, and
    15 to 35 volume percent of at least one of Periodic Group IVB metal nitrides.

3. The ceramic composite according to claim 1 wherein said Periodic Group IVB metal nitride is titanium nitride.

4. A ceramic abrasive particle consisting of a uniform composite of microcrystalline components, said composite consisting essentially of
    0 to 90 volume percent aluminum nitride or polytypes of aluminum nitride,
    5 to 95 volume percent gamma-aluminum oxynitride, and
    5 to 50 volume percent of at least one of Periodic Group IVB metal nitrides,
said composite being essentially free of alumina and containing less than 4 volume percent pores, and the size of said components being less than 5 micrometers.

5. The ceramic abrasive particle according to claim 4 wherein said composite consists essentially of
    5 to 45 volume percent aluminum nitride or polytypes of aluminum nitride,
    40 to 85 volume percent gamma-aluminum oxynitride, and
    15 to 35 volume percent of at least one of Periodic Group IVB metal nitrides, said composite being essentially free of alumina 6. The ceramic composite particle according to claim 4 wherein said Period Group IVB metal nitride is titanium nitride.

7. The abrasive particle according to claim 4 which is a grit, flake, or rod.

8. A microcrystalline, nearly fully dense, ceramic composite consisting of grains consisting essentially of
    0 to 80 volume percent aluminum nitride or polytypes of aluminum nitride,
    0 to 85 volume percent gamma-aluminum oxynitride, and
    15 to 35 volume percent of at least one of Periodic Group IVB metal nitrides,
said composite containing less than 4 volume percent pores, and the size of said grains being less than 5 micrometers.

9. A ceramic abrasive particle consisting of a uniform composite of microcrystalline components, said composite consisting essentially of
    0 to 80 volume percent aluminum nitride or polytypes of aluminum nitride,
    0 to 85 volume percent gamma-aluminum oxynitride, and
    15 to 35 volume percent of at least one of Periodic Group IVB metal nitrides, said composite having less than 4 volume percent pores, and the size of said components being less than 5 micrometers.

10. A microcrystalline, nearly fully dense, ceramic composite consisting of grains consisting essentially of
    0 to 90 volume percent aluminum nitride or polytypes of aluminum nitride,
    5 to 95 volume percent gamma-aluminum oxynitride,
    5 to 50 volume percent of titanium nitride, and more than zero and up to 3 volume percent zirconium nitride,
said composite being essentially free of alumina and containing less than 4 volume percent pores, and the size of said grains being less than 5 micrometers.

11. A ceramic abrasive particle consisting of a uniform composite of microcrystalline components, said composite consisting essentially of
    5 to 90 volume percent aluminum nitride or polytypes of aluminum nitride,
    5 to 95 volume percent gamma-aluminum oxynitride,
    5 to 50 volume percent of titanium nitride, and more than zero and up to 3 volume percent zirconium nitride,
said composite being essentially free of alumina and containing less than 4 volume percent pores, and the size of said components being less than 5 micrometers.

* * * * *

UNITED STATES PATENT AND TRADEMARK OFFICE
CERTIFICATE OF CORRECTION

PATENT NO. : 4,788,167

DATED : November 29, 1988

INVENTOR(S) : James P. Mathers, et al.

It is certified that error appears in the above-identified patent and that said Letters Patent is hereby corrected as shown below:

Col. 5, line 25, delete "$Al_{(2+x))}3N_x$" and insert therefor -- $Al_{(2+x)}O_3N_x$ --.

Col. 5, line 46, delete "oxide" and insert therefor -- oxides --.

Col. 8, line 34, delete "gell" and insert therefor -- gel --.

Signed and Sealed this

Thirteenth Day of June, 1989

Attest:

DONALD J. QUIGG

Attesting Officer

Commissioner of Patents and Trademarks